United States Patent [11] 3,579,812

| [72] | Inventor | Stanley A. Pfister<br>Wilmington, Ohio |
|---|---|---|
| [21] | Appl. No. | 761,235 |
| [22] | Filed | Sept. 20, 1968 |
| [45] | Patented | May 25, 1971 |
| [73] | Assignee | Cincinnati Milacron Inc.<br>Cincinnati, Ohio |

[54] MACHINE TOOL
4 Claims, 4 Drawing Figs.

| [52] | U.S. Cl. | 29/568 |
|---|---|---|
| [51] | Int. Cl. | B23q 3/157 |
| [50] | Field of Search | 29/568;<br>77/25 |

[56] References Cited
UNITED STATES PATENTS

| 3,161,951 | 12/1964 | Anthony | 29/568 |
| 3,266,141 | 8/1966 | Jacobson et al. | 29/568 |
| 3,449,822 | 6/1969 | Laumann et al. | 29/568 |

*Primary Examiner*—Andrew R. Juhasz
*Assistant Examiner*—F. R. Bilinsky
*Attorney*—Norman S. Blodgett ABSTRACT: This invention relates to a machine tool and, more particularly, to apparatus for performing a machining operation, which apparatus is provided with a multiple-tool storage rack and means for moving selected tools from that rack into position on a rotatable spindle. The rack is provided with a plurality of identical sockets to carry the tools from the rack to an interchange position and return them to the rack.

INVENTOR
STANLEY A. PFISTER

BY Norman S. Blodgett
ATTORNEY

MACHINE TOOL

BACKGROUND OF THE INVENTION

It has become common practice to control a single-spindle machine tool by numerical control and, furthermore, to provide for the use of any one of a plurality of tools by storing these tools in a suitable rack. Furthermore, the taped numerical instructions are adapted to set in motion certain apparatus for removing tools from the storage rack and placing them on the spindle for operation under taped instructions for machining. Most such machine tools, however, are very expensive and the apparatus for storing the tools can be quite complex and difficult to maintain properly. In many cases, the tools must be held in sockets by relatively complex and expensive apparatus and are exposed to the dirt, cutting, oil, and chips which exist in the vicinity of the working area of the machine tool. Many of these storage racks do not make the tool available for random use and, for various reasons, they may not be readily accessible for inspection and replacement of the tools. They also require complex and expensive memory circuits, tool coding, double interchanging, and sequential storage. These and other difficulties experienced with the prior art devices have been obviated in a novel manner by the present invention.

It is, therefore, an outstanding object of the invention to provide a machine tool having a tool storage rack which is inexpensive and relatively maintenance free.

Another object of this invention is the provision of a machine tool having a tool storage rack which features a coded tool compartment for each tool.

A further object of the present invention is the provision of a machine tool having a tool storage which is capable of random access.

It is another object of the instant invention to provide a machine tool of the tape-controlled type having a tool storage rack which is at a convenient height for tool inspection and replacement.

A still further object of the invention is the provision of a machine tool having a tool storage means which can be protected from dirt, fluid, and chips from the machining operation and wherein the tool shanks are particularly protected from foreign matter.

It is a further object of the invention to provide a machine tool having a tool storage rack which is capable of receiving both straight or tapered tool shanks and which is adaptable to low cost production.

It is a still further object of the present invention to provide a numerically controlled machine tool operated from taped instructions having a tool storage rack and an interchanger between the rack and the work spindle, wherein the tool storage rack is simple in construction, rugged and capable of a long life of useful service.

It is another object of the invention to provide a machine tool with tool storage and interchanger facilities, wherein a used tool is always returned to its original storage chamber, but in an identical though different socket.

A further object of the invention is to provide a toolchanger machine tool which does not require memory circuits or tool coding.

With these and other objects in view, as will be apparent to those skilled in the art, the invention resides in the combination of parts set forth in the specification and covered by the claims appended hereto.

SUMMARY OF THE INVENTION

In general, the present invention relates to a machine tool having a toolhead with a rotatable spindle, having an interchanger mounted adjacent the spindle, and having a tool storage rack mounted adjacent the interchanger. The tool storage rack includes tool chambers located in two parallel spaced rows with an access path between them and including a carriage movable along the access path to carry a tool from one of the tool chambers to an interchange position for movement by the interchanger from the interchange position to the spindle. The rack includes a plurality of chambers and a plurality of identical sockets, each adapted to be received in any of the chambers and to hold a tool; the rack also has an interchange position to which a socket is brought holding a new tool and receiving an old tool after interchange takes place.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
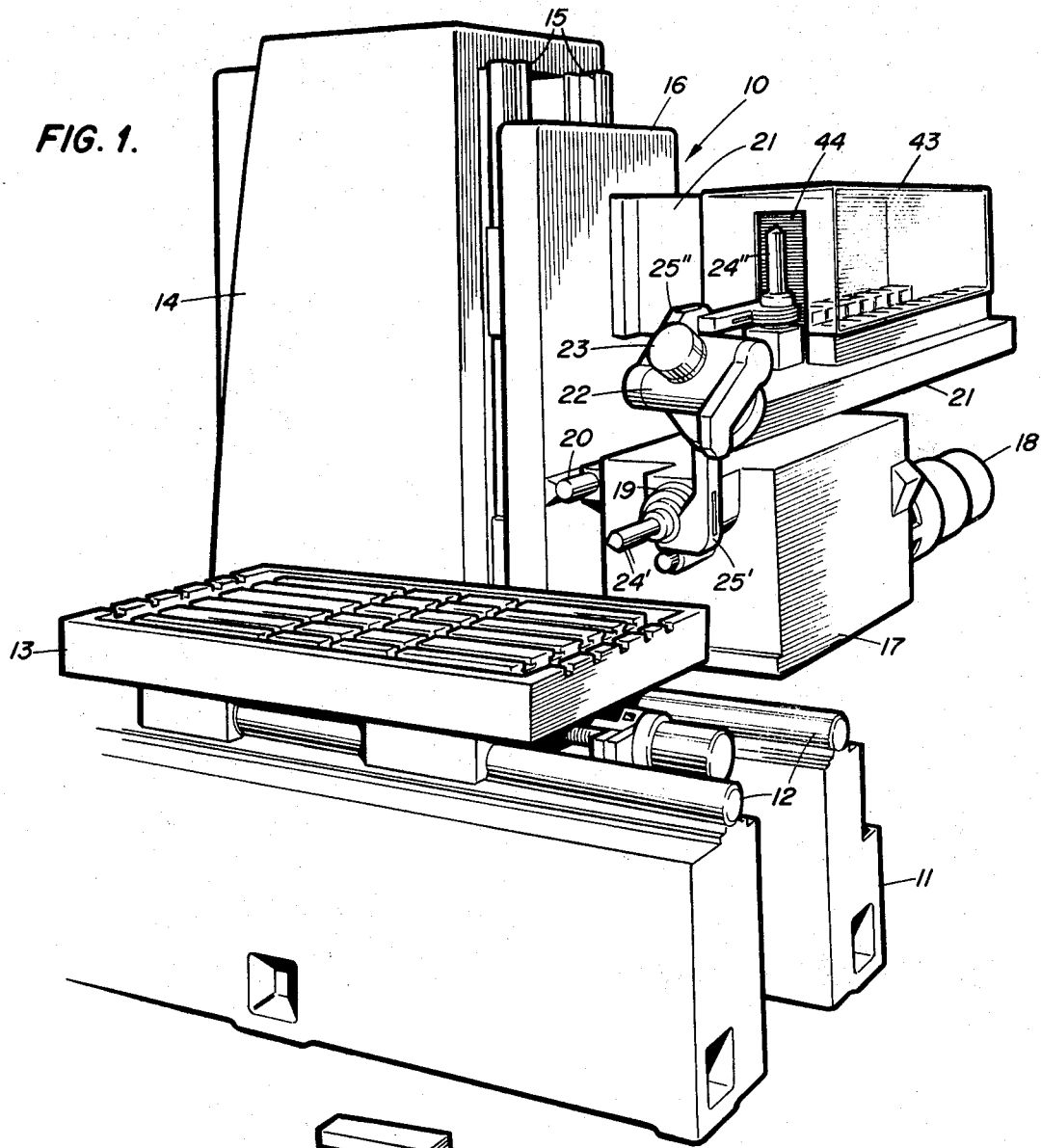
FIG. 1 is a perspective view of a machine tool embodying the principles of the present invention.

Referring first to FIG. 1, which best shows the general features of the invention, the machine tool, indicated generally by the reference numeral 10, is shown as having a base 11 provided with parallel ways 12 for the sliding movement of a table 13 along the X-axis. Extending upwardly from the base 11 is a vertical column 14 having parallel vertical ways 15 on which is mounted a table 16 for movement along the Y-axis. The table is provided with horizontal ways 20 on which is carried a toolhead 17 which is movable along the ways to produce the Z-axis motion. The toolhead has rotatably mounted in it a spindle 19 driven by an electric motor 18.

Mounted on the table 16 above the toolhead 17 is a tool storage rack 21 which carries on its lower side an interchanger 22. This interchanger is of the type shown and described in the U.S. Pat. application of Seidel et al., Ser. No. 691,034, filed Dec. 15, 1967 (CD–5562). It is rotatable about an inclined shaft 23 and is provided with two arms 25' and 25" which are separately hinged about axes which are arranged at right angles to the axis of the shaft 23 and are spaced on opposite sides of it. As shown in the drawing, the interchanger 22 is in process of placing a new tool 24' in a socket in the spindle 19 and replacing an old tool 24" in the tool storage rack 21.

Figure 2:
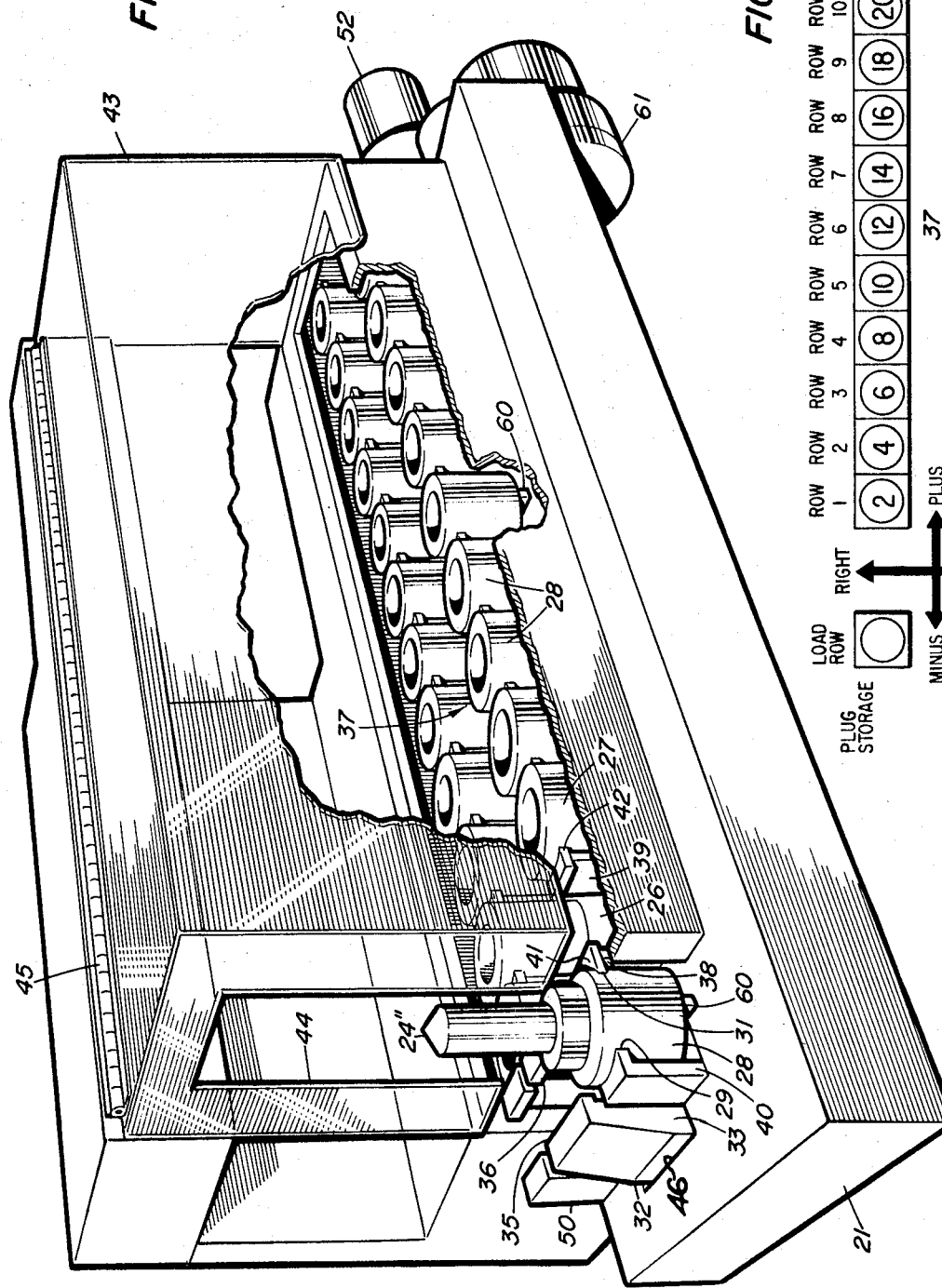
FIG. 2 is a perspective view of a tool storage rack forming part of the invention.
Figure 4:
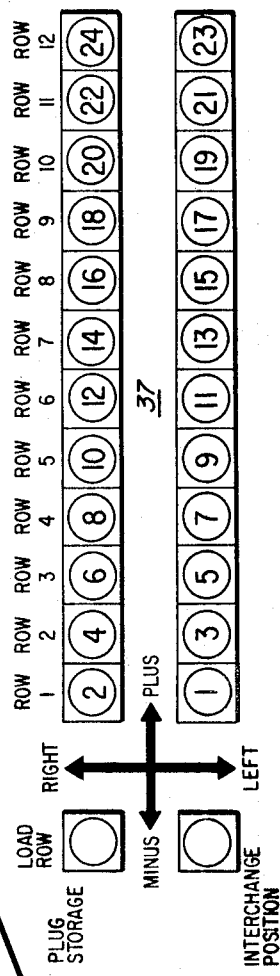
FIG. 4 is a generally schematic view of the tool storage rack for use in describing its operation.

In FIG. 2, it can be seen that the tool storage rack 21 is generally horizontal and is provided with a plurality of chambers 26,27, etc. Associated with each of the chambers is a socket 28. It can be seen that the socket associated with the chamber 26 has been moved from the chamber and that it is of a generally tubular shape. It is provided on its outer surface with parallel grooves 29 and 31 near its upper end. Engaged with this particular socket is a carriage 32 having vertical spaced parallel plates 33 and 34 embracing the socket, which plates are provided with inwardly directed flanges 35 and 36, respectively, which engage the grooves 29 and 31. The chambers 26,27, etc., are arranged in two parallel horizontal rows with a space between them operating as an access path 37. The chamber 26 is defined by two parallel transverse plates 38 and 39, which are provided at their upper edges with flanges 41 and 42, respectively, which engage the grooves 29 and 31 in the socket 28 when it lies within the chamber 26. An interchange chamber 40 is located in line with the chambers 26 and 27, while a plug storage chamber 50 is also provided in line with the other row of chambers. A cover 43, which is preferably formed of a transparent plastic, envelopes the entire rack area with the exception of a door 44 located in the access path 37 at the interchanger end of the storage rack. The cover 43 is provided with a hinge 45 that enables it to be lifted away from the tools for tool inspection or replacement. The carriage 32 and its operating mechanisms are substantially enclosed within the housing of the tool storage rack and it is shown in FIG. 2 in an "interchange position" provided by a slot 46 in the housing.

Figure 3:
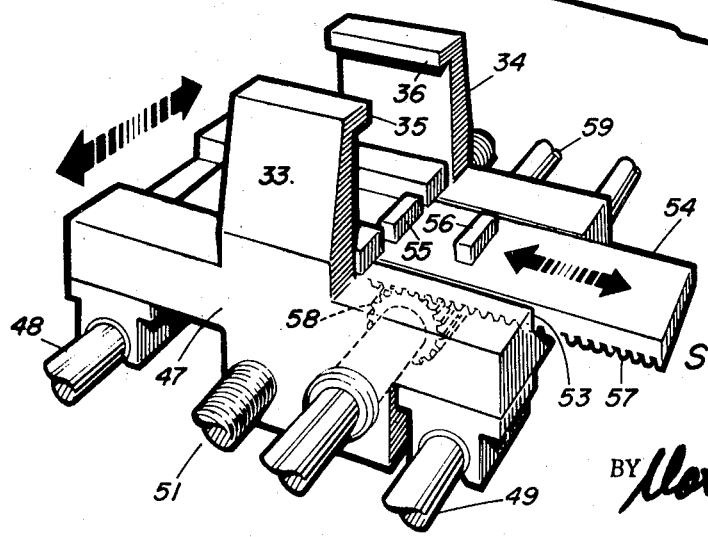
FIG. 3 is a perspective view of a carriage operative in the tool storage rack.

Referring now to FIG. 3, it can be seen that the carriage 32 is provided with a main body 47 supported in the housing of the tool storage rack on parallel ways 48 and 49. Extending through the main body is a screw 51 which is driven by a motor 52 (see FIG. 2). The main body 47 is formed with a trackway that extends transversely of the ways 48 and 49 in the upper surface between the plates 33 and 34. In this trackway 53 is located a laterally slidable portion 54 having upwardly extending cleats 55 and 56. These cleats are parallel to and spaced from one another and they extend parallel to the ways 48 and 49. The undersurface of the portion 54 is provided with a rack 57 engaged by a pinion gear 58 mounted on a shaft 59 extending through the main body 47 and operated by a motor 61 (see FIG. 2).

The operation of the invention will now be readily understood, in view of the above description. Let us assume that the apparatus is in the condition shown in FIG. 2. The old tool 24″ has just been returned to the interchange chamber 40 and placed into socket 28. This tool and its socket 28 are to be placed in its compartment 26 which is empty. Presumably, a new tool 24′ has been placed in the spindle 19 and the numerical controls associated with the machine tool 10 are operative in regulating the tool and the workpiece on the table 13 in such a way as to perform the necessary machining action. While this is going on, the old tool 24″ is being returned to its position in the rack. The motor 52 is energized to rotate the screw 51 and to move the carriage 32 down the access path 37. When it comes opposite the compartment 26, it is stopped and the motor 61 is energized to rotate the shaft 59 with the pinion gear 58. This operates through the rack 57 to move the portion 54 laterally. The cleats 55 and 56 embrace the cleats 60 on opposite sides of the socket 28 and, therefore, carry it laterally, so that the grooves 29 and 31 of the socket move off the flanges 35 and 36 of the carriage. At the same time, they move onto the flanges 41 and 42 of the walls 38 and 39, so that, when the portion 54 eventually comes to rest with the cleats 55 and 56 in the compartment 26, the socket 28 is entirely supported by the flanges 41 and 42.

By this time, the tape controls for the machine tool are now ready to indicate to the tool storage rack the next tool to be placed i the interchange position. If the new tool lies in a socket which is in a compartment in the same "left" row as the compartment 26, it is only necessary to energize the motor 52 and the screw 51 to move the entire carriage down that row. The cleats 55 and 56 are free to move on either side of the row of sockets 28 until the proper one is reached. When the proper socket is reached in that manner, the carriage is stopped and the motor 61 is reversed with its shaft 59, thus moving the portion 54 laterally into the access path, so that the cleats 55 and 56 carry the socket 28 off the compartment flanges and onto the flanges 35 and 36 of the carrier. The carriage then moves down the access path 37 until it reaches the end and then is moved laterally to the interchange chamber 40 where it waits for the interchanger to operate to remove the tool from the socket and to put a tool which has just been removed from the spindle into that socket. The sockets themselves are interchangeable, so that a particular tool may end up in any socket 28 and also be returned to any compartment. This is made possible by the type of circuits associated with the tape controls of the machine tool. This circuitry removes the need for random access tool storage; that is to say, the tool is always replaced in its "home" chamber, so that the carriage can go back to that compartment to obtain that particular tool when it is needed again.

Now, let us suppose that the new tool which is to be obtained by the carriage after it has deposited the socket 28 and the tool 25 in the compartment 26, is in the opposite or "right" row. In that case, the carriage must be moved longitudinally to a point midway between two adjoining compartments where lateral translation can be accomplished without interference of cleats 55 and 56 with the socket cleats 60. Then, it is possible to move the portion 54 laterally all the way to the other side. The cleats 55 and 56 are then lined up with the right row of compartments and tool sockets. The carriage is moved down the access path carrying the portion 54 and its cleats 55 and 56 down the right row wit the cleats on either side of the sockets 28. Eventually, the carriage reaches the point where the cleats lie on opposite sides of the socket containing the particular new tool. At that time, the portion 54 is moved laterally to bring the socket into engagement with the flanges 35 and 36 of the carriage. The carriage moves back down the access path 37 until it is beside the interchange position. The socket is then laterally transferred to the interchange chamber 40. The manipulation of the carriage and its portion 54 takes place under instructions from the tape machine which instructs it to carry out the movement to the interchange position and the shifting of the element 54 from one side to another when the circuits reveal that the next tool which must be obtained lies in the opposite row from the row in which the old tool has just been deposited.

It can be seen, then, that the machine tool of the present invention provides tool storage features which are quite desirable. It lends itself particularly well to operation by numerical control and, especially, for a numerical control using a system of returning the tool to its own chamber. The storage rack 21 can be located at a convenient height for tool inspection and replacement and yet the tools are stored out of the portion of the machine tool which is normally the dirtiest. In any case, the cover 43 provides for cleanliness of the tools and protection of the tool shank; particularly since, in a numerically controlled tool-changing machine, it is important that the surfaces which join the tool to the spindle be maintained in a very clean condition for accuracy of location of the tool tip. This tool storage rack is capable of accepting either straight or tapered-shank tools and is particularly adaptable to low cost production. It is possible to bring about the interchange portion of the cycle quite rapidly, since the desired new tool can be located in the interchange position while the old tool is busy performing the machining operation. A plug storage position is provided for inserting a plug in the socket of the spindle after the entire series of machining operations has been completed, so that dirt cannot gain access to the socket of the spindle. At the same time, a tool storage cycle is completed to place all of the tools back in their sockets and compartments under the canopy or cover 43, so that they, too, are protected from foreign matter.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

I claim:

1. A machine tool for use with tool sets, each consisting of a tool and toolholder, comprising
   a. a toolhead having a rotatable spindle having an axial recess to receive a tool set,
   b. an interchanger mounted adjacent the spindle,
   c. a tool storage rack mounted adjacent the interchanger, including chambers located in two parallel spaced rows with an access path between them and a plurality of identical sockets, each adapted to be received in any of the chambers and to hold a tool set, and
   d. a carriage movable along the access path to carry a socket from one of the chambers to an interchange position for movement of a tool from the socket by the interchanger from the interchange position to the spindle, a portion of the carriage being slidable at a right angle to the access path to move a socket in and out of a chamber.

2. A machine tool as recited in claim 1, wherein each tool is carried in a socket which has parallel opposed grooves formed in its upper portion and wherein the carriage is provided with two spaced parallel plates adapted to lie on either side of the socket and inwardly directed flanges engageable with the grooves.

3. A machine tool as recited in claim 2, wherein the said plates and flanges are mounted on parallel ways for movement along the access path only, and wherein the said laterally slidable portion is slidably mounted on the main body and is provided with upwardly extending cleats extending parallel to and spaced from one another in the direction of the rows.

4. A machine tool as recited in claim 3, wherein a screw extends through the main body of the carriage parallel to its ways to produce the motion along the access path, and wherein a similar shaft extends through the main body parallel to the ways and has a pinion gear engageable with a rack formed on the undersurface of the said laterally movable portion.